(12) United States Patent
Gila et al.

(10) Patent No.: US 10,217,044 B2
(45) Date of Patent: Feb. 26, 2019

(54) TRANSPONDER AND METHOD FOR TUNING THE RADIO TRANSPONDER

(71) Applicant: Siemens Aktiengesellschaft, Munich (DE)

(72) Inventors: Janos Gila, Moedling (AT); Martin Jahn, Eisgarn (AT); Martin Schiefer, St. Poelten (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/739,305

(22) PCT Filed: Jun. 9, 2016

(86) PCT No.: PCT/EP2016/063117
§ 371 (c)(1),
(2) Date: Dec. 22, 2017

(87) PCT Pub. No.: WO2017/001163
PCT Pub. Date: Jan. 5, 2017

(65) Prior Publication Data
US 2018/0189626 A1 Jul. 5, 2018

(30) Foreign Application Priority Data
Jun. 30, 2015 (EP) .................................... 15174568

(51) Int. Cl.
*G06K 19/077* (2006.01)
*G06K 19/07* (2006.01)
(Continued)

(52) U.S. Cl.
CPC ... *G06K 19/07773* (2013.01); *G06K 19/0709* (2013.01); *G06K 19/0723* (2013.01);
(Continued)

(58) Field of Classification Search
CPC ......... G06K 19/07773; G06K 19/0723; G06K 19/0709; G06K 19/0726; H04B 17/318; H04B 1/40
(Continued)

(56) References Cited

U.S. PATENT DOCUMENTS

2010/0019907 A1  1/2010  Shanks
2012/0235847 A1  9/2012  Viikari et al.

FOREIGN PATENT DOCUMENTS

CN    102859889        1/2013
JP    2006/243920  *  9/2006
(Continued)

OTHER PUBLICATIONS

PCT International Search Report and Written Opinion of International Searching Authority dated Jun. 9, 2016 corresponding to PCT International Application No. PCT/EP2016/063117 filed Jun. 9, 2016.

*Primary Examiner* — Nay A Maung
*Assistant Examiner* — Angelica M Perez
(74) *Attorney, Agent, or Firm* — Cozen O'Connor

(57) ABSTRACT

A method for tuning a radio transponder having an antenna, a transceiver unit and a resonant circuit connected to the antenna, wherein the resonant circuit includes a plurality of capacitors arranged in parallel, where each capacitor is arranged in series with a fuse, where a capacitor is switchable via a fuse arranged in series to tune the resonant circuit, and where a control unit associated with the resonant circuit is configured to produce a switching signal for a respective fuse of the resonant circuit based on a control signal transmitted by a radio transponder reader.

12 Claims, 3 Drawing Sheets

(51) Int. Cl.
*H04B 17/318* (2015.01)
*H04B 1/40* (2015.01)

(52) U.S. Cl.
CPC ........... *G06K 19/0726* (2013.01); *H04B 1/40* (2013.01); *H04B 17/318* (2015.01)

(58) Field of Classification Search
USPC ........................................ 455/77, 41.1–41.3
See application file for complete search history.

(56) References Cited

FOREIGN PATENT DOCUMENTS

| | | | |
|---|---|---|---|
| JP | 2006243920 | | 9/2006 |
| WO | WO 2006/093132 | | 9/2006 |
| WO | WO 2008/065003 | * | 6/2008 |

* cited by examiner

TRANSPONDER AND METHOD FOR TUNING THE RADIO TRANSPONDER

CROSS-REFERENCE TO RELATED APPLICATIONS

This is a U.S. national stage of application No. PCT/EP2016/063117 filed 9 Jun. 2016 and claims priority of European application No. 15174568 filed Jun. 30, 2015, the content of which is incorporated herein by reference in its entirety.

BACKGROUND OF THE INVENTION

1. Field of the Invention

The present invention relates to RFID (radio frequency identification) systems and, more particularly, to a radio transponder and method for tuning the radio transponder.

2. Description of the Related Art

In (radio frequency identification) (RFID) systems, a maximum reading range and a possible distance between transponder or tag and reader are definitively dependent on a tuning of the transponder for its input resonant circuit. This particularly includes antenna and coil properties. Effective tuning of the input resonant circuit requires the involvement of not only transponder components, such as the housing, but also ambient conditions. Usually, transponders are tuned for assumed typical surroundings. If real ambient conditions differ from those assumed, this generally has an adverse effect on the reading range. By way of example, in industrial installations, commonly occurring metal surfaces greatly influence reception and reading range on account of reflections. A mismatch is particularly critical in the case of passive transponders, because the absence of a power supply of their own means that there are no compensation options that can keep compensation values.

The input resonant circuit of a transponder can fundamentally be tuned by adjusting antenna inductance and circuit input capacitance. However, this allows an adjustment to suit varying ambient conditions only rudimentarily.

US 2010/0019907 A1 describes a self-tuning RFID tag whose antenna is adjusted automatically through regulation of the active and reactive power parts of an antenna-side complex impedance. Both the active power component and the reactive power part have a separate control loop provided for each them. The control loop for the reactive power component causes selective connection of capacitive and inductive components to the input resonant circuit of the transponder. By contrast, the control loop for the active power component is used to regulate a current source integrated in the input resonant circuit of the transponder. The design described in US 2010/0019907 A1 is therefore unsuitable for passive transponders without a power supply of their own.

RFID and near-field communication (NFC) transponder chips, of M24SR type, for which the input resonant circuit is tunable via a varactor diode are known. Here, the varactor diode is controlled by a voltage, and a constant supply of power to the transponder chip is required. As a result, when the varactor diode is used, there is also no possibility to use passive solutions in this.

SUMMARY OF THE INVENTION

In view of the foregoing, it is therefore an object of the present invention to provide a passively operable radio transponder that is adjustable in a simple manner for use under different ambient conditions, and to provide a suitable method for tuning the radio transponder.

This and other objects and advantages are achieved in accordance with the invention by a method and a radio transponder, such as an RFID tag, which comprises an antenna, a transmission and reception unit and a resonant circuit that is connected to the antenna and that comprises a plurality of capacitors arranged in parallel with one another. The capacitors are each arranged in series with a fuse. In this arrangement, a capacitor is connectable via a series-arranged fuse to tune the resonant circuit, such as by blowing the respective fuse. In addition, a control unit associated with the resonant circuit is provided that is configured to generate a trip signal for a respective fuse of the resonant circuit based on a control signal transmitted by a radio transponder reader or generated in a radio transponder control unit. Moreover, the radio transponder has a memory unit that can be read or written to via a radio transponder reader. Preferably, the radio transponder is operated passively or has no power supply of its own.

Use of fuses as tuning elements for the resonant circuit of the radio transponder in accordance with the invention allows passive operation without a dedicated power supply without any problems. Furthermore, the resonant circuit of the radio transponder is tunable by selectively connecting the capacitors and therefore by adjusting the resonant frequency of the radio transponder for use in different surroundings. This particularly allows an improved reading range.

In accordance with the invention, the resonant circuit has a capacitance diode arranged in parallel with the capacitors. In this arrangement, the control unit is configured to actuate the capacitance diode within an iterative resonant frequency ascertainment process based on a control signal transmitted by a radio transponder reader or generated in a radio transponder control unit. This particularly allows an accurate calibration of the resonant circuit, specifically before the fuses associated with the capacitors are ultimately tripped or blown. Furthermore, the control unit may be configured to generate a trip signal for a respective fuse of the resonant circuit based on a resonant frequency ascertained by a radio transponder reader. Here, the trip signals for the fuses are used to effect a final configuration of the resonant circuit.

Preferably, the control signal transmitted by the radio transponder reader is derived from a field strength measured value that a response signal of the radio transponder comprises. Alternatively, the control signal in the radio transponder control unit may be derived from a field strength measured value measured in the radio transponder. Moreover, the control unit is advantageously configured to initiate a transmission of the response signal by the transmission and reception unit upon reception of an interrogation signal from a radio transponder reader.

In accordance with a preferred embodiment of the present invention, the fuses are polysilicon fuses. The polysilicon fuses are trippable, specifically irreversibly, by a current load, for example. In accordance with an alternative embodiment of the present invention, the fuses may be integrated in a semiconductor chip and trippable by laser.

In the method of the invention for tuning a radio transponder in accordance with the disclosed embodiments, a radio transponder reader is used to send an interrogation signal to the radio transponder. The radio transponder ascertains a field strength measured value for the interrogation signal and transmits a response signal containing the field strength measured value to the radio transponder reader or to a radio transponder control unit. The radio transponder reader or the radio transponder control unit compares the field strength measured value with a prescribable reference value, such as an earlier or preceding field strength measured value. Furthermore, the radio transponder reader or the radio transponder control unit, in the event of a defined discrepancy in the field strength measured value from the reference value, prompts connection of a first resonant circuit capacitor via an associated fuse or a first capacitance value of the radio transponder, and fresh ascertainment of an updated field strength measured value for fresh evaluation. In the event of a defined discrepancy in the updated field strength measured value from the reference value, the radio transponder reader or the radio transponder control unit iteratively prompts connection of a further resonant circuit capacitor via an associated fuse or a further capacitance value of the radio transponder, and fresh field strength ascertainment.

In accordance with the invention, the resonant circuit comprises a capacitance diode arranged in parallel with the capacitors. In this arrangement, the capacitance diode is actuated within an iterative resonant frequency ascertainment process by the radio transponder reader or by the radio transponder control unit based on the field strength measured value. Furthermore, the resonant circuit capacitors, for a final configuration of the resonant circuit, are connected, in accordance with an advantageous embodiment of the method in accordance with the invention, via associated fuses based on a resonant frequency ascertained by the radio transponder reader or by the radio transponder control unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which.

DETAILED DESCRIPTION OF THE EXEMPLARY EMBODIMENTS

Figure 1:
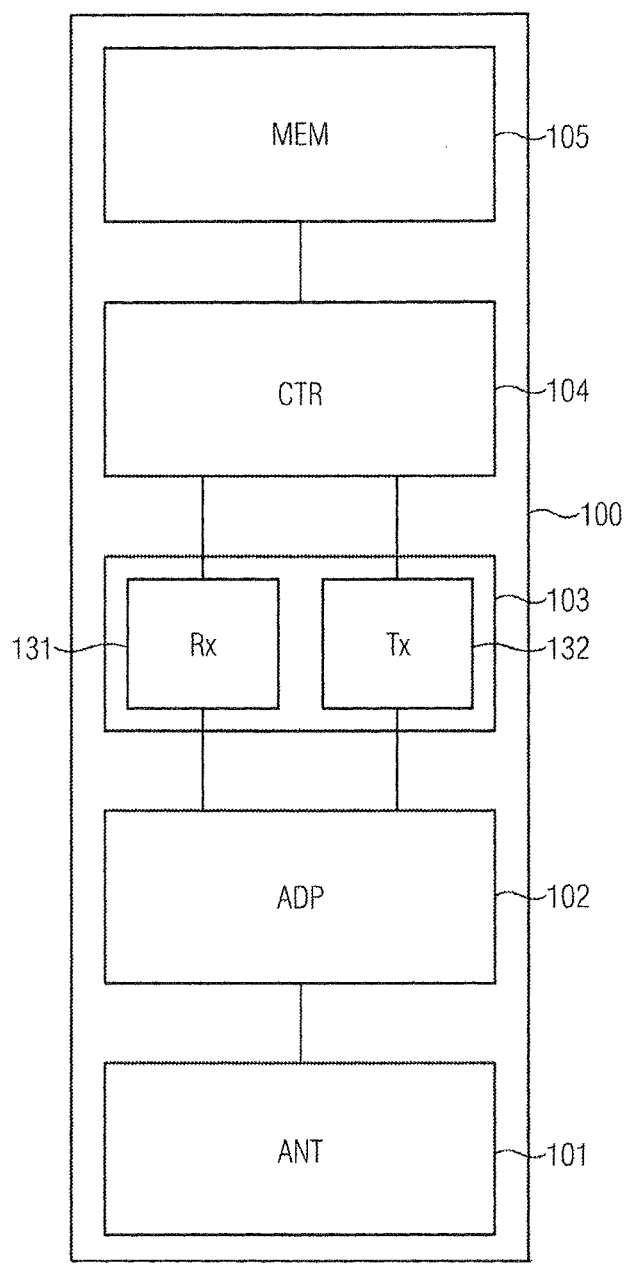
FIG. 1 shows a schematic depiction of a radio transponder in accordance with the invention.

The radio transponder 100 depicted in FIG. 1 is an RFID tag in the present exemplary embodiment and comprises an antenna 101 and also a transmission and reception unit 103, which has a demodulator unit 131 and a modulator unit 132 for decoding interrogation signals for the radio transponder 100 and for coding response signals from the radio transponder 100.

Figure 2:
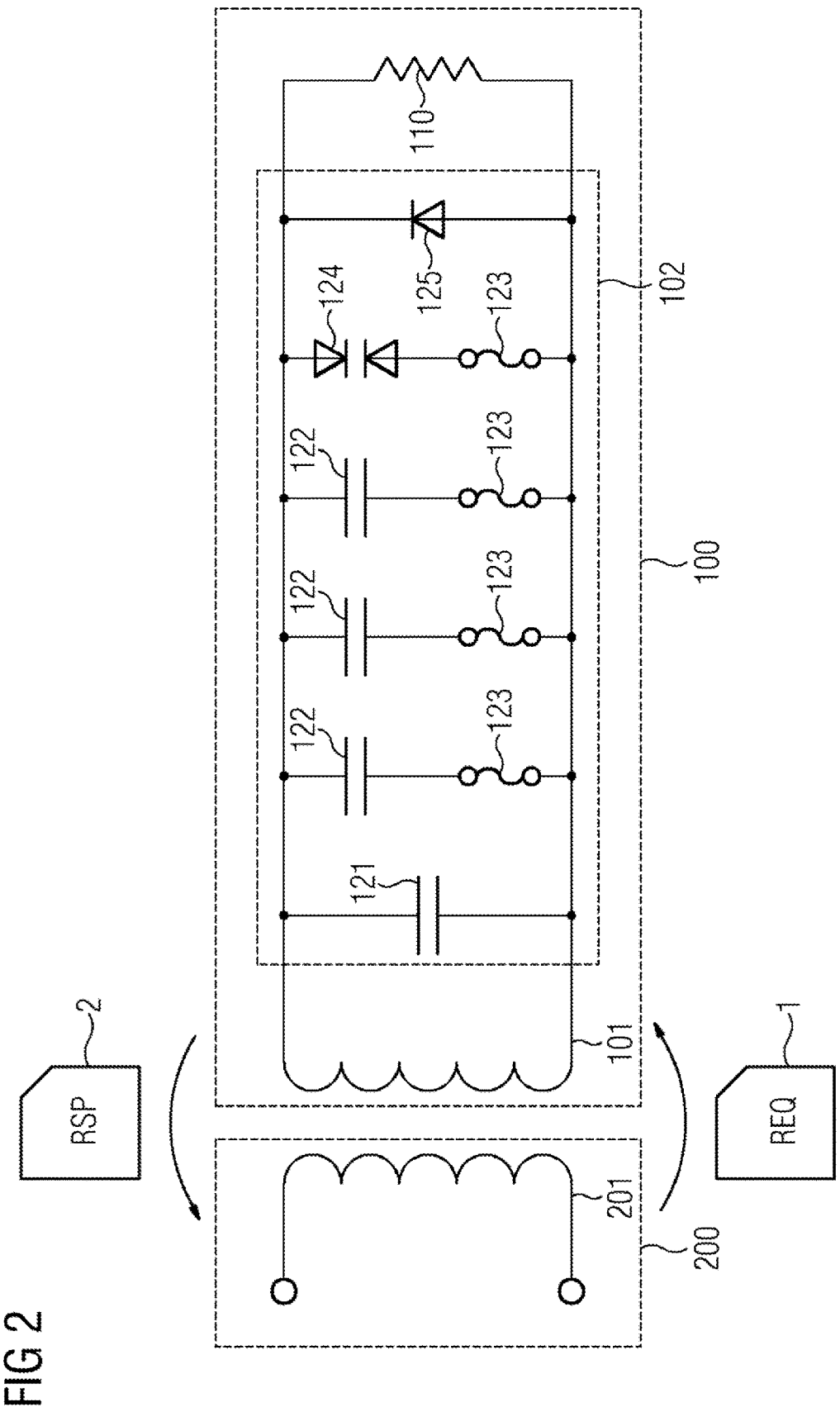
FIG. 2 shows an equivalent circuit diagram for a radio transponder system having the radio transponder of FIG. 1 and a radio transponder reader connected thereto.

In accordance with the equivalent circuit diagram depicted in FIG. 2 for a radio transponder system, interrogation signals 1 are preferably transmitted by a radio transponder reader 200 to the radio transponder 100, while response signals 2 are transmitted from the radio transponder 100 to the radio transponder reader 200. The antenna 101 of the radio transponder 100 and an antenna 201 of the radio transponder reader 200 are modelled as intercoupled inductances in the equivalent circuit diagram by way of example. The two antennas can fundamentally also be formed as conventional radiation elements that are in a far field. The transmission and reception unit 103, a control unit 104 and a memory unit 105 of the radio transponder 100 are combined in the equivalent circuit diagram shown in FIG. 2 and are modelled as a load resistance 110. The memory unit 105 of the radio transponder 100 can be read and written to via the radio transponder reader 200. The radio transponder 100 is operated passively in the present exemplary embodiment and has no power supply of its own, but rather is fed via interrogation signals 1 of the radio transponder reader 200.

Additionally, the radio transponder 100 comprises an adaptable resonant circuit 102 that is connected firstly to the antenna 101 and secondly to the transmission and reception unit 103. This resonant circuit 102 has, in accordance with the exemplary embodiment depicted in FIG. 2, a plurality of capacitors 122 arranged in parallel with one another that are each arranged in series with a fuse 123. In this arrangement, the capacitors 122 can each be disconnected via their associated fuse 123 to tune the resonant circuit 102. The fuses 123 may be polysilicon fuses, for example, which are integrated in a semiconductor chip and connectable via a current load. Alternatively, the fuses 123 may be integrated in a semiconductor chip and connectable via laser. Furthermore, the adaptable resonant circuit 102 is connected to the control unit 104 of the radio transponder 100, which control unit is provided inter alia to generate trip signals for the fuses 123 of the resonant circuit 102 based on a control signal transmitted via the radio transponder reader 200. Such a control signal preferably comprises an interrogation signal 1 of the radio transponder reader 200.

In parallel with the disconnectable capacitors 122 and their associated fuses 123, the resonant circuit 102 comprises a permanently connected capacitor 121, a capacitance diode 124 and a protection diode 125. Actuation of the capacitance diode 124 is effected within an iterative resonant frequency ascertainment process by the control unit 104, based specifically on a control signal transmitted by the radio transponder reader 200. Here, the control unit 104 is provided to generate trip signals for the fuses 123 of the resonant circuit 102 based on a resonant frequency ascertained by the radio transponder reader 200. The trip signals for the fuses 123 are therefore used to effect a final configuration of the resonant circuit 102. The control signal for the control unit 104, which control signal is transmitted by the radio transponder reader 200, is derived from a field strength measured value formed by a response signal 2 transmitted by the radio transponder 100. Furthermore, the control unit 104 is provided to initiate a transmission of a response signal 2 by the transmission and reception unit 103 upon reception of an interrogation signal 1 from the radio transponder reader 200.

Figure 3:
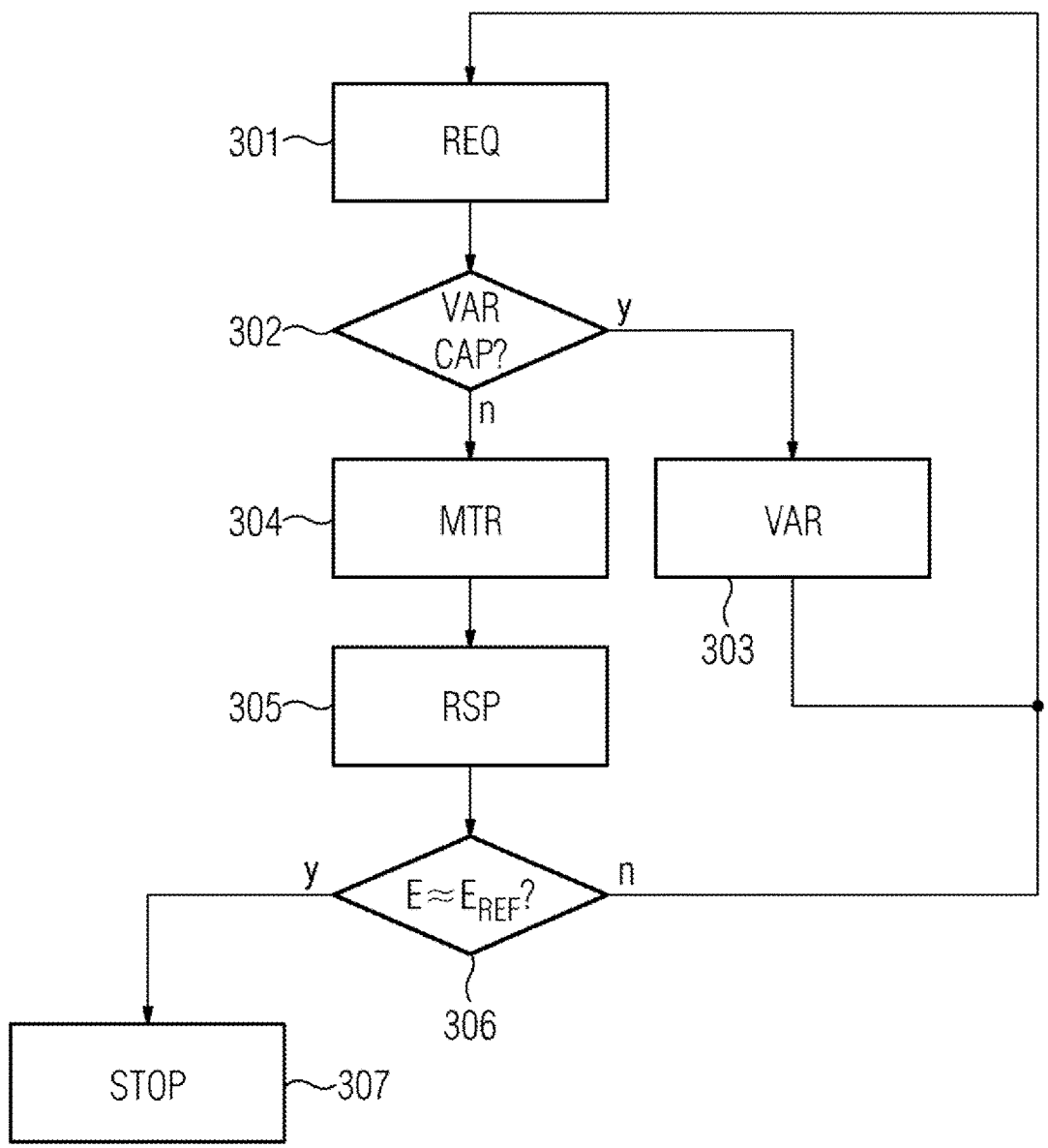
FIG. 3 shows a flowchart for tuning the radio transponder of FIG. 1.

In accordance with the flowchart depicted in FIG. 3 for tuning the radio transponder in accordance with the disclosed embodiments, the radio transponder reader 200 initially all sends an interrogation signal 1 to the radio transponder 100 (step 301). As shown in step 302, the radio transponder 100 then checks whether the interrogation signal 1 comprises a control signal for configuring the resonant circuit 102. If so, the radio transponder 100 adjusts the configuration of its resonant circuit 102 (step 303), either provisionally through actuation of the capacitance diode 124 or finally through tripping of fuses 123. The radio transponder 100 now subsequently awaits a new interrogation signal 1 from the radio transponder reader 200.

If the interrogation signal 1 does not comprise a control signal for configuring the resonant circuit 102, then the radio transponder 100 ascertains a field strength measured value for the interrogation signal 1 in accordance with step 304 and subsequently transmits a response signal 2 containing the field strength measured value to the radio transponder reader 200 (step 305). In step 306, the radio transponder reader 100 compares the field strength measured value with a prescribable reference value, which can come from an earlier field strength measurement, for example. In the event of a defined discrepancy in the field strength measured value from the reference value, the radio transponder reader 100 prompts disconnection of a resonant circuit capacitor 122 or connection of a capacitance value of the capacitance diode 124. To this end, the radio transponder reader 200 transmits an interrogation signal 1 with a corresponding control signal (provisional/final) to the radio transponder 100 afresh in accordance with step 301. After adjustment of the configuration of the resonant circuit 102 according to step 303, a fresh transmission of an interrogation signal 1 to the radio transponder 100 is initiated. For this interrogation signal 1, the radio transponder 100 transmits an updated field strength measured value to the radio transponder reader 200 in accordance with steps 304 and 305 for a re-evaluation. In the event of a defined discrepancy in the updated field strength measured value from the reference value, the above tuning process is iteratively re-performed. Otherwise, the tuning process can be terminated in accordance with step 307.

In accordance with a further embodiment, the radio transponder can itself perform tuning of its adjustment. To this end, the radio transponder reader sends a defined signal to the radio transponder, which then starts autonomous trimming. This involves the radio transponder evaluating the measured field strength and optimizing its adjustment independently of the radio transponder reader. By setting a status bit, the radio transponder can indicate whether and when the trimming has concluded. By repeatedly reading this bit, the radio transponder reader can monitor a status of the trimming. Fundamentally, it is always important for trimming that the distance between the radio transponder reader and the radio transponder and also the transmission field strength of the radio transponder do not change during trimming.

While there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A radio transponder comprising:
an antenna;
a transmission and reception unit;
a resonant circuit connected to the antenna and comprising a plurality of capacitors arranged in parallel with one another and each arranged in series with a fuse, a capacitor of the plurality of capacitors being connectable via a series-arranged fuse to tune the resonant circuit;
a control unit associated with the resonant circuit, said control unit being configured to generate a trip signal for a respective fuse of the resonant circuit based on a control signal one of (i) transmitted by a radio transponder reader and (ii) generated in a radio transponder control unit; and
a memory unit at least one of readable and written to via a radio transponder reader;
wherein the resonant circuit comprises a capacitance diode arranged in parallel with the plurality of capacitors; and
wherein the control unit is configured to actuate the capacitance diode within an iterative resonant frequency ascertainment process based on the control signal one of (i) transmitted by the radio transponder reader and (ii) generated in the radio transponder control unit.

2. The radio transponder as claimed in claim 1, wherein the control unit is configured to generate the trip signal for a respective fuse of the resonant circuit based on a resonant frequency ascertained by one of (i) the radio transponder reader and (ii) the radio transponder control unit; and wherein trip signals for fuses are used to effect a final configuration of the resonant circuit.

3. The radio transponder as claimed in claim 2, wherein one of (i) the control signal transmitted by the radio transponder reader is derived from a response signal of the radio transponder comprising a field strength measured value and (ii) the control signal in the radio transponder control unit is derived from the field strength measured value measured in the radio transponder.

4. The radio transponder as claimed in claim 1, wherein one of (i) the control signal transmitted by the radio transponder reader is derived from a response signal of the radio transponder comprising a field strength measured value and (ii) the control signal in the radio transponder control unit is derived from the field strength measured value measured in the radio transponder.

5. The radio transponder as claimed in claim 4, wherein the control unit is configured to initiate a transmission of the response signal by the transmission and reception unit upon reception of an interrogation signal from a radio transponder reader.

6. The radio transponder as claimed in claim 1, wherein fuses are polysilicon fuses.

7. The radio transponder as claimed in claim 6, wherein the polysilicon fuses are trippable via a current load.

8. The radio transponder as claimed in claim 1, wherein fuses are integrated in a semiconductor chip and are trippable via laser.

9. The radio transponder as claimed in claim 1, wherein the radio transponder is a radio frequency identification (RFID) tag.

10. The radio transponder as claimed in claim 1, wherein the radio transponder is at least one of (i) operated passively and (ii) includes no power supply of its own.

11. A method for tuning a radio transponder, the method comprising:
- sending an interrogation signal to a radio transponder from a radio transponder reader;
- ascertaining, by the radio transponder, a field strength measured value for the interrogation signal;
- transmitting, by the radio transponder, a response signal containing the measured field strength value to one of (i) the radio transponder reader and (ii) a radio transponder control unit;
- comparing, by one of (i) the radio transponder reader and (ii) the radio transponder control unit the measured field strength value with a prescribable reference value;
- prompting, by one of (i) the radio transponder reader and (ii) the radio transponder control unit, in an event of a defined discrepancy in the measured field strength value from the reference value, connection of a first resonant circuit capacitor via one of (i) an associated fuse and (ii) a first capacitance value of the radio transponder, and re-ascertaining an updated field strength measured value for a new evaluation; and
- prompting iteratively, by one of (i) the radio transponder reader and (ii) the radio transponder control unit, in the event of the defined discrepancy in the updated measured field strength value from the prescribable reference value, connection of a further resonant circuit capacitor via one of (i) the associated fuse and (ii) a further capacitance value of the radio transponder, and re-ascertaining the field strength;
- wherein the resonant circuit comprises a capacitance diode arranged in parallel with capacitors; and
- wherein the capacitance diode is actuated within an iterative resonant frequency ascertainment process by one of (i) the radio transponder reader and (ii) the radio transponder control unit based on the measured field strength value.

12. The method as claimed in claim 11, wherein the resonant circuit capacitors are connected via associated fuses, for a final configuration of the resonant circuit, based on a resonant frequency ascertained by one of (i) the radio transponder reader and (ii) the radio transponder control unit.

\* \* \* \* \*